Sept. 16, 1969     D. A. LONG ET AL     3,467,246
MULTIPLE IDENTIFICATION BAND ASSEMBLY AND
METHOD OF MAKING THE SAME
Filed April 7, 1967     3 Sheets-Sheet 1
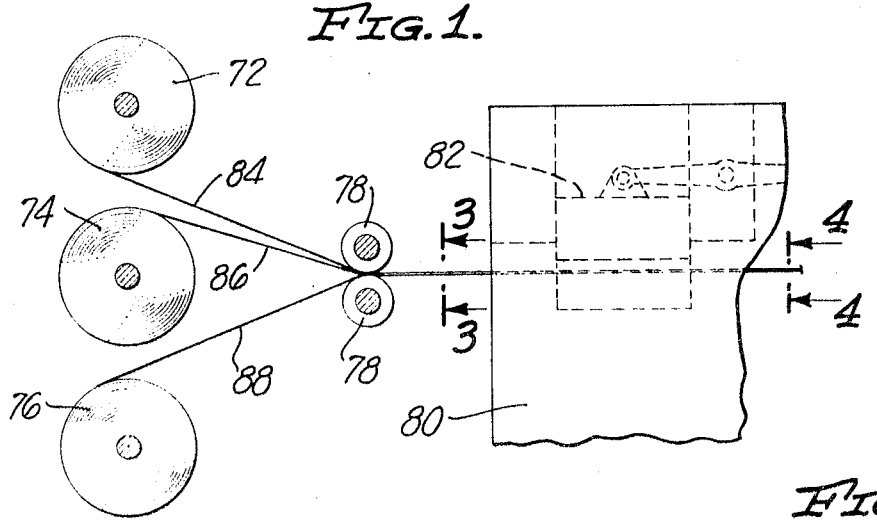
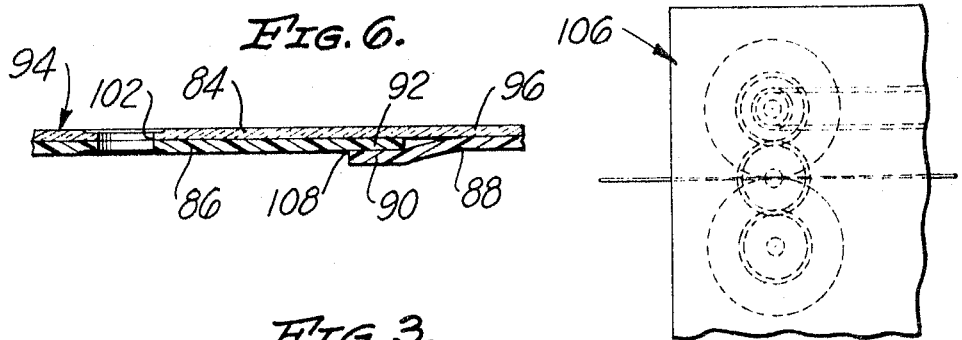
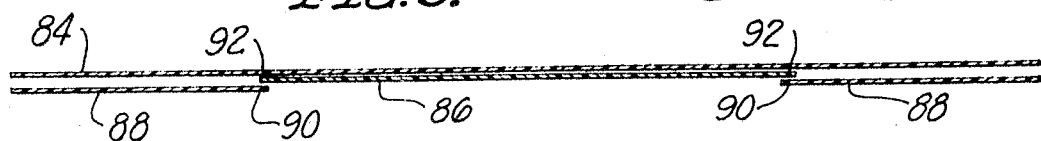
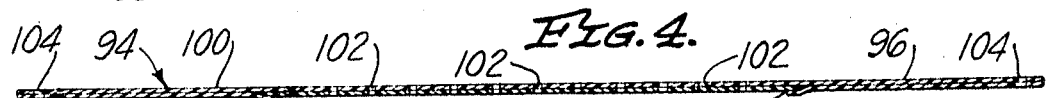
INVENTORS
DONALD A. LONG,
WALTER W. MOSHER, JR.
BY
MAHONEY & HORNBAKER
ATTORNEYS

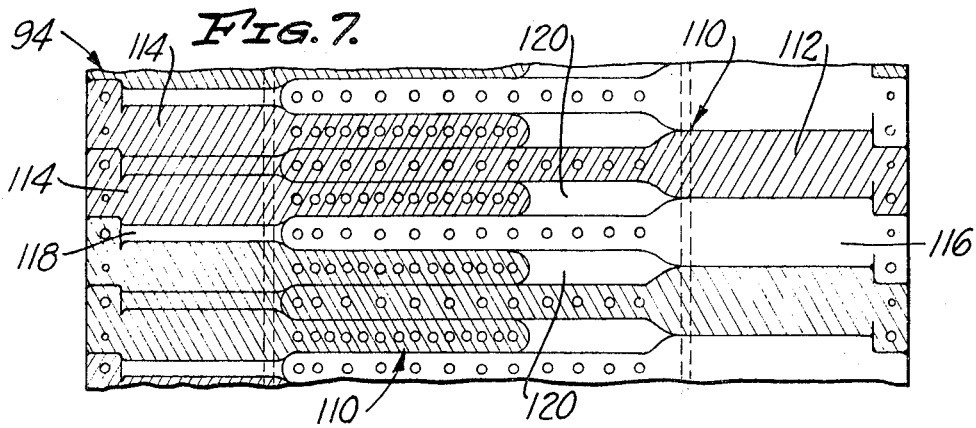
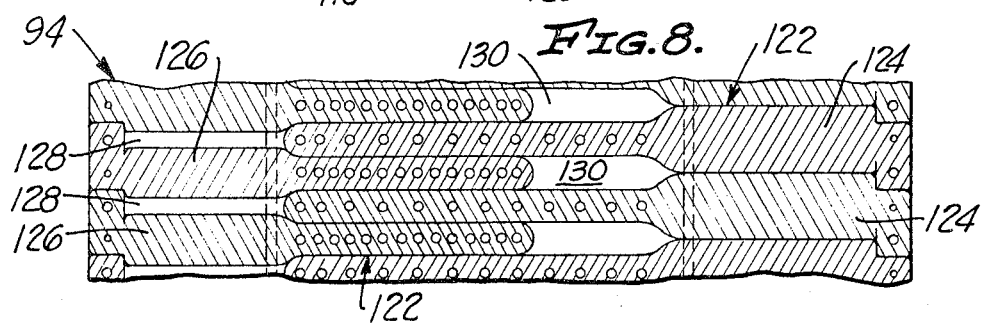
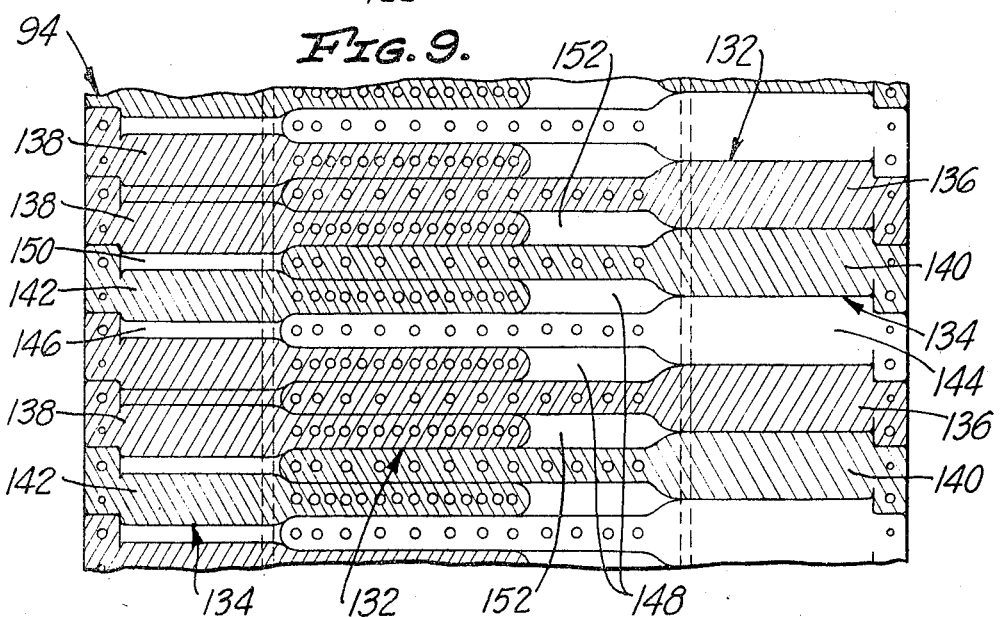

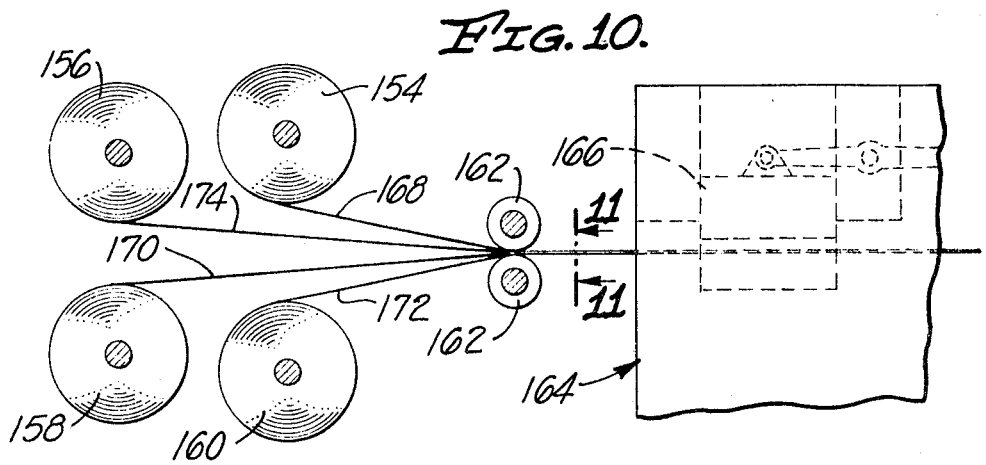
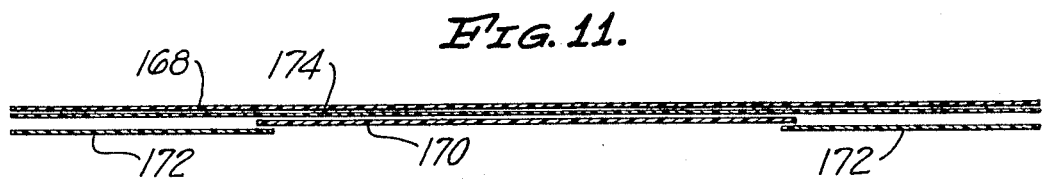
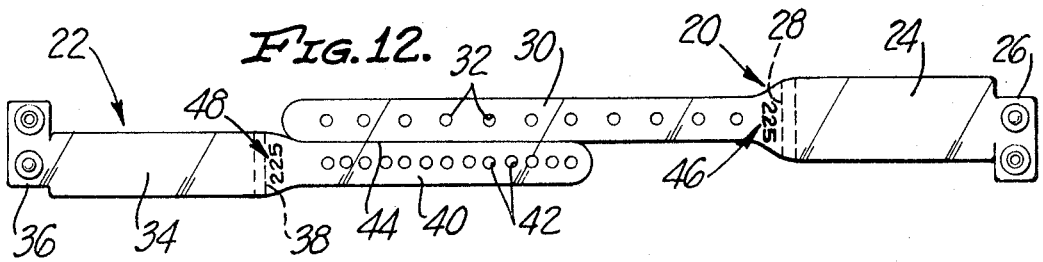
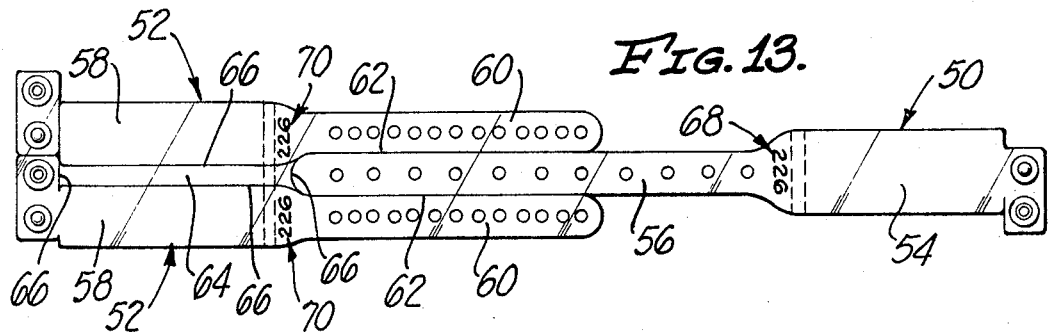
INVENTORS
DONALD A. LONG,
WALTER W. MOSHER, Jr.
BY
MAHONEY & HORNBAKER
ATTORNEYS United States Patent Office 3,467,246
Patented Sept. 16, 1969

3,467,246
MULTIPLE IDENTIFICATION BAND ASSEMBLY
AND METHOD OF MAKING THE SAME
Donald A. Long and Walter W. Mosher, Jr., Burbank,
Calif., assignors to Precision Dynamics Corporation,
Burbank, Calif., a corporation of California
Filed Apr. 7, 1967, Ser. No. 629,145
Int. Cl. B65d 83/00; G09f 3/14
U.S. Cl. 206—56                                     14 Claims

ABSTRACT OF THE DISCLOSURE

A plurality of bands are formed in a nested, unitary assembly with each band having identification pocket and strap portions defining peripheral edges which are connected through tear lines to adjacent of said bands in the assembly for tearable separation of the individual bands at the time of use. All of the bands of the unitary assembly are formed with interrelated identifying markings during the assembly formation, and all assembly bands consist of multiple plies of relatively easily stretchable, plastic material with a relatively non-stretchable membrane ply coextensive with the entire assembly. The entire assembly, including the tear lines, may be formed by heat sealing.

---

This invention relates to identification bands of the type used for identifying patients of hospitals and rest homes, said bands normally having a pocket into which an identification paper or card may be inserted, with the bands being secured around the wrists or ankles of the patients. More particularly, this invention relates to identification bands of the foregoing type which may be provided as multiple band assemblies, each assembly consisting of a plurality of bands of a number required for the multiple identification of a single patient or the identification of related patients, for instance, where it is desirable to provide an identification band on both a wrist and an ankle of an individual patient, or where it is desired to provide one or more identification bands on each of a mother and said mother's baby.

This invention also relates to a particular construction of individual identification bands of the foregoing type, which construction is of superior quality to the prior constructions, yet may be provided more economically than said prior constructions.

Various forms of identification bands of the type referred to in the foregoing have heretofore been provided, and in recent years such identification bands have usually been formed of multiple ply, sheet plastic. The various plies of a particular band have been secured together so as to form an identification pocket portion and a strap portion, the pocket portion having access means for inserting identification material therein in order to properly identify a particular patient or patients.

Furthermore, the bands are formed with fastening means thereon for selectively securing the bands encircling the wrist or ankles of the patients to provide ready identification of the patients despite the patients' condition or the capability of the patients of self-identification.

There are many occasions where it is desirable to provide multiple band identification either on a single patient or related identification on several related patients. For instance, one of the most usual instances where it is desirable to provide multiple identification is on a mother and the mother's child immediately after the birth and during the mother's and child's confinement in the hospital immediately following said birth. The mother is usually provided with an identification band around her wrist, and the child with a band around the wrist and also sometimes the ankle to avoid any possibility of an incident of mistake.

In the case of mother and baby identification, due to the relative size of the related patients, it is necessary to provide a band of larger size for the mother and a band or bands of appreciably smaller size for the baby. Thus, the procedure followed prior to the present invention has been that of a nurse at the time of birth being required to select an appropriate band for the mother and an appropriate band or bands for the baby, insert the necessary identification material therein, and then secure the same to the particular mother and baby. This selection of the appropriate bands is time consuming in the present day busy hospitals, and can still result in the possibility of mistakes in view of the fact that the necessary identification material for insertion in the bands is not always readily available at the exact time of birth and, even if available, may be wrongly inserted in the detached mother and baby bands.

In addition, in the fabrication of the prior identification band constructions from plastic sheet material, the usual procedure has been to first stamp out an individual band from a sheet of plastic material and then overlap certain parts of the stamped band to form the identification pocket thereof with said overlapped parts being cemented or otherwise sealed to form said pocket. In order to provide the prior bands as economically as possible, the plastic sheet from which the bands are stamped has usually been of a relatively soft, easily stretchable plastic material which could not be used in such stretchable form. For this reason, it is then necessary to cement a relatively thin ply of somewhat stiffer and non-stretchable plastic material to each band, all of which adds to the fabrication cost thereof, both from the material and labor standpoint.

It is, therefore, an object of our invention to provide a multiple identification band assembly wherein the proper number of bands required for multiple identification of a single patient or multiple identification of related patients are retained secured together in a single assembly until the exact moment of securing the bands to the patient or patients, at which time, the bands may be quickly and easily separated for said use. As a result, it is unnecessary for a nurse to initially select the proper bands for the patient or patients, but rather the selection has previously been made at the time of fabrication of the assembly. In the provision of mother and baby related bands in the single assembly, one or more larger mother bands may be secured in assembly with one or more smaller baby bands, so that, again, all of the bands and of a proper size are provided in one assembly for the related mother and baby, eliminating the necessity of a nurse selecting a proper mother and proper baby band at the time of birth and under the rush conditions normally present at such time.

It is a further object of our invention to provide a multiple identification band assembly of the foregoing type wherein initial, simple identification may be provided on each of the bands of a single assembly, thereby eliminating any possibility of confusion or mistake. Each of the bands of a single assembly may be initially imprinted with a single identification number at the time of fabrication of said assembly. Thus, if the proper identification material for insertion in the pockets of the bands is not readily available at the initial time the bands are secured to the patients, the related identification of the patients is still readily apparent from said number on each of the related bands.

It is also an object of our invention to provide a multiple identification band assembly wherein the method of forming said bands is of a unique nature, relatively simple and economical to carry out so as to provide said band assemblies at a minimum of cost. According to the principles of the present invention, it is possible to fabricate a plurality of said band assemblies in a single over-all assembled form with said over-all assembled form quickly and easily being separated into individual band assemblies, each containing the proper number of bands for the multiple band identification hereinbefore discussed. As a result, the multiple identification band assemblies of the present invention may be formed on a continuous, production-line basis, reducing the fabrication cost thereof to a bare minimum.

It is an additional object of our invention to provide a multiple identification band assembly as hereinbefore discussed wherein the bands are of a multi-ply construction formed of a series of superimposed plies of a relatively soft, stretchable plastic material and with each band including a relatively stiff, thin ply of non-stretchable plastic material eliminating the difficulty with the stretchable plies, yet the bands may be provided of superior quality and at less expense than has heretofore been possible with the prior constructions. The nonstretchable ply is assembled with the stretchable plies in a single, continuous assembly operation. Furthermore, the non-stretchable ply is sealed with the stretchable plies at the same normal time of sealing of the stretchable plies, thereby eliminating the requirement of an extra fabricating operation and reducing the fabrication cost to a minimum.

With these and other objects in view, the invention consists of the construction, arrangement and combination of the various elements of the device whereby the objects contemplated are attained, as hereinafter set forth, and illustrated in the accompanying drawings:

FIG. 1 is a fragmentary, side elevational view, somewhat diagrammatic and partially in section, illustrating apparatus for continuously fabricating one form of the multiple identification band assemblies of the present invention;

FIG. 2 is a fragmentary, side elevational view, somewhat diagrammatic, illustrating apparatus for imprinting a single identification number on each of the bands of a single identification band assembly;

FIG. 3 is an enlarged, vertical sectional view taken along the broken line 3—3 in FIG. 1;

FIG. 4 is a view similar to FIG. 3 but taken along the broken line 4—4 in FIG. 1;

FIG. 5 is a fragmentary, top plan view of the sheet of identification band assemblies of FIG. 4;

FIG. 6 is an enlarged, fragmentary vertical sectional view taken along the broken line 6—6 in FIG. 5;

FIG. 7 is a fragmentary, top plan view, somewhat diagrammatic, showing a sheet of multiple identification band assemblies prior to separation into individual multiple band assemblies, with each individual band assembly consisting of three bands;

FIG. 8 is a view similar to FIG. 7 but with each individual multiple band assembly consisting of two bands;

FIG. 9 is a view similar to FIGS. 7 and 8 but with alternate individual multiple band assemblies consisting of two and three bands;

FIG. 10 is a fragmentary, side elevational view, somewhat diagrammatic and partially in section, illustrating apparatus for assembling a somewhat modified form of the multiple identification band assembly of the present invention;

FIG. 11 is an enlarged, vertical sectional view taken along the broken line 11—11 in FIG. 10;

FIG. 12 is a top plan view of an individual multiple identification band assembly consisting of two bands; and FIG. 13 is a top plan view of an individual multiple identification band assembly consisting of three bands.

Referring to FIG. 12 of the drawings, an individual multiple identification band assembly of the present invention may consist of two selectively separable identification bands, in this case, a larger mother's identification band generally indicated at 20, and a smaller baby's identification band generally indicated at 22, both being formed of multiple ply, plastic, sheet material.

The mother's identification band 20 includes a tubular, identification pocket portion 24 having a usual snap-fastener end 26 and pocket access slot 28, with said pocket portion being integrally connected to a strap portion 30 having fastening holes 32. The baby's identification band 22 is similarly formed, but of smaller size, having an identification pocket portion 34 with a snap-fastener end 36 and a pocket access slot 38, and having a strap portion 40 with fastening holes 42.

One of the face plies of each of the mother's and baby's identification bands 20 and 22 is preferably formed of transparent plastic so that identification material inserted in the respective pocket portions 24 and 34 thereof will be visible through said transparent ply in the usual manner. Furthermore, when the identification bands 20 and 22 are separated in a manner to be hereinafter described into individual identification bands, the respective strap portions 30 and 40 thereof may have appropriate of the fastening holes 32 and 42 engaged in the usual manner by the respective snap-fastener ends 26 and 36 so as to secure each of the bands in continuous encircling band form for use.

The mother's identification band 20 may be positioned around a mother's wrist, and the baby's identification band 22 may be positioned around a baby's wrist or ankle, thereby properly identifying a related mother and baby in the usual manner.

Particularly according to the principles of the present invention, all of the peripheral edges of the multi-ply, plastic mother's identification band 20 and baby's identification band 22 are preferably heat-sealed or chemically sealed and in the fabricated assembly shown in FIG. 12, the pocket portion 24 of the mother's band is directly oppositely depending from said assembly to the pocket portion 34 of the baby's band. Furthermore, in the flat sheet assembly, adjacent peripheral edges of a part of the mother's band strap portion 30 and the baby's band strap portion 40 remain edge-connected although heat-sealed or chemically sealed and separated by a weakened tear line 44 either resulting from the sealing or some usual form of perforations, said edge-connection thereby retaining the mother's and baby's identification bands 20 and 22 in said multiple identification band assembly.

Thus, the previously properly selected mother's and baby's identification bands 20 and 22 may be retained in the multiple identification band assembly shown in FIG. 12 right up to the time of actual use, and at such time, said bands may be readily selectively separated along the weakened tear line 44 merely by tearing therebetween to provide the individual mother's and baby's bands 20 and 22 as separate bands for the appropriate uses thereof.

Furthermore, in view of the fact that a multiple identification band assembly is provided, all of said bands of a single assembly being used to provide a single identification at multiple locations on a single patient or on multiple related patients, such as a mother and the mother's baby, each of the bands of said multiple band assembly may be provided with the same identification number imprinted thereon.

As illustrated in FIG. 12 on the double band assembly, the numeral "225" is imprinted on the mother's identification band 20 at 46 and on the baby's identification band 22 at 48, thereby tying down the relationship between the mother's and baby's bands of a particular assembly and the relationship between the mother and baby upon which said bands are used. In this manner, an initial identification or tying relationship between the mother and baby is immediately established as soon as the respective bands are applied and even though the particular identification pocket portions thereof do not yet have identification material positioned therein, thereby avoiding any possibility of confusion or mistake.

Referring to FIG. 13, a three-band assembly is shown formed in most respects similar to the two-band assembly described above but including a single mother's identification band generally indicated at 50 and two baby's identification bands generally indicated at 52. The mother's identification band 50 again includes the same identification pocket portion 54 and strap portion 56, with each of the baby's identification bands 52 including the same identification pocket portions 58 and strap portions 60, said mother's band, of course, being larger than the baby's bands.

In such triple band assembly, however, the part of the mother's band strap portion 56 is nested between the baby's bands strap portions 60 peripheral edge-connected thereto to secure the three bands in a single assembly by weakened, selectively separable, tear lines 62. A connecting scrap piece 64 may also be left between the baby's bands pocket portions 58 connected thereto and to the end of the mother's band strap portion 56 through appropriate weakened tear lines 66 for removal at the time of use and during the separation of the mother's and baby's bands 50 and 52, said connected scrap piece aiding in retaining the mother's and baby's bands in assembly until such time of use.

Thus, with such triple band assembly, similar to the double assembly of FIG. 12, the various mother's and baby's bands 50 and 52 may be separated at the exact moment of use with the scrap piece 64 discarded, the mother's band 50 being secured encircling the mother's wrist and the baby's bands 52 secured with one encircling the baby's wrist and one encircling the baby's angle. The mother's band 50 and the baby's bands 52 of said assembly may be imprinted with the same numeral during original fabrication thereof, in this case, the numeral "226" at 68 on the mother's band and at 70 on the baby's bands, to thereby provide ready identification of the related mother and baby even though identification material may not yet have been inserted in the pocket portions 54 and 58 of the respective bands.

Referring to FIGS. 1 through 6, certain of the methods of the present invention are illustrated for forming sheets, each including a plurality of either the two-band assemblies shown in FIG. 12 or the three-band assemblies shown in FIG. 13, or both of said two- and three-band assemblies, the possibility of choice between said assemblies to be hereinafter described in more detail. For the moment, however, apparatus for forming sheets of said assemblies is illustrated, somewhat diagrammatically, in FIG. 1 and includes a continuous ply supply roll 72, a strap portion supply roll 74, and a pair of axially aligned and axially spaced pocket portion supply rolls 76, the end of only one of the latter being apparent in FIG. 1.

Furthermore, the apparatus of FIG. 1 includes a pair of positioning rolls 78 and a die frame 80 reciprocally mounting a heat-sealing die 82. A continuous ply 84 from the supply roll 72, a strap portion ply 86 from the supply roll 74, and pocket portion plies 88 from the supply rolls 76 are directed between the positioning rolls 78 in the manner shown in FIG. 1 and particularly with the relative positioning as shown in FIG. 3, that is, with interior edges 90 of the pocket portion plies preferably slightly overlapping edges 92 of the strap portion ply. The continuous ply 84 is preferably formed of a transparent, heat-sealable plastic material, and the strap portion and pocket portion plies 86 and 88 are preferably formed of a translucent or opaque, heat-sealable plastic material, all in sheet form so as to ultimately form a multi-ply, flat sheet of the identification band assemblies hereinbefore described.

In the particular case shown, where the identification bands merely consist of the continuous, strap portion and pocket portion plies 84, 86 and 88, it is preferred that said plies will not be relatively easily stretchable in order that the final identification bands formed therefrom will likewise not be excessively stretchable.

After the continuous, strap portion and pocket portion plies 84, 86 and 88 pass between the positioning rolls 78 assembled in the manner shown in FIG. 3, said assembled plies are directed through the die frame 80 and beneath the heat-sealing die 82. The heat-sealing die 82 is formed such that one stroke thereof against the assembled plies will simultaneously heat-seal the peripheral edges of all of a plurality of identification bands contained in a single, multi-ply sheet of said bands, each sheet preferably including a plurality of multiple identification band assemblies, whether of the double band assemblies shown in FIG. 12 or the triple band assemblies shown in FIG. 13, or both. One of said sheets of bands, generally indicated at 94, is shown in full transverse cross section in FIG. 4, in fragmentary top plan in FIG. 5, and in an enlarged fragmentary, transverse cross section in FIG. 6, and it will be noted that not only are peripheral edges of an aligned series of longitudinally adjacent mother's identification bands 96 and an aligned series of longitudinally adjacent baby's identification bands 98 heat-sealed with weakened tear lines simultaneously formed therebetween and around a series of scrap portions 100, but also, strap portion fastening holes 102 and snap-fastener holes 104 are simultaneously formed.

After the operation with the heat-sealing die 82, as described, the sheets of bands 94 prior to disconnection between said sheets may be directed continuously through conventional printing apparatus illustrated at 106 in FIG. 2 for appropriately numbering the individual bands of the various multiple band assemblies, as hereinbefore described. Also, those bands of each of the sheets 94 to be later included as a part of one of the multiple band assemblies, as will be hereinafter described, may then be provided with the appropriate fasteners secured in the fastener holes 104 in the conventional manner.

It will be still further noted that during the foregoing heat-sealing operation with the heat-sealing die 82, the overlapping of the strap portion and pocket portion plies 86 and 88 is not heat-sealed except at the peripheral edges of the bands. Thus, as best seen in FIGS. 4 and 6, access slots 108 are formed in each of the individual bands for entrance into the pockets formed therein, as previously described.

Furthermore, these access slots 108 are at the translucent sides of the ultimate individual straps so as to be positioned interiorly against the patient where an individual band is positioned encircling the particular patient's wrist or ankle. Such interior positioning and the overlapped positioning described provides the identification pockets of the individual bands virtually waterproof, so that the identification material therein is not disturbed under usual conditions.

Upon the formation of the sheet or sheets of bands 94, as illustrated in FIGS. 1 and 3 through 6, any of said sheets 94 may be selectively separated by tearing along selected of the heat-seal formed tear lines thereof into a plurality of triple or three-band assemblies of the configuration shown in FIG. 13, or into a plurality of double or two-band assemblies of the configuration shown in FIG. 12, or into a plurality of mixed triple band and double band assemblies. The manner of separation of one of the sheets 94 to produce the particular type or combination of band assemblies is illustrated somewhat diagrammatically in FIGS. 7, 8 and 9, with the particular band assemblies being shaded to distinguish the same from the unshaded scrap areas.

The separation of FIG. 7 produces a plurality of triple band assemblies, the separation of FIG. 8 a plurality of double band assemblies, and the separation of FIG. 9 a plurality of mixed triple and double band assemblies.

Referring to FIG. 7 and considering one of the ultimate triple band assemblies, generally indicated at 110, each of said triple band assemblies 110 will include a single mother's band 112 and two baby's bands 114 edge-connected as previously described, and shown in FIG. 13.

Between each of the triple band assemblies 110 there will be a scrap mother's band 116 with an end-connected scrap piece 118 and adjacent connected scrap pieces 120, all of which are discarded at the time of such separation. A plurality of triple band assemblies 110 each including one mother's band 112 and two baby's bands 114 may thereby be provided from one of the sheets of bands 94 by the selective separation described.

As shown in FIG. 8, this same sheet of bands 94 may be selectively separated into a plurality of double band assemblies, generally indicated at 122, with each consisting of a single mother's band 124 edge-connected to a single baby's band 126. In this case, the only scrap pieces discarded at the time of separation are end-connected scrap pieces 128 and adjacent connected scrap pieces 130. All of the bands are used in the plurality of separated double band assemblies 122.

The manner of separation of the sheet 94, as shown in FIG. 9, produces alternate triple band assemblies, generally indicated at 132, and double band assemblies, generally indicated at 134, with each of the triple band assemblies 132 including one mother's band 136 and two baby's bands 138 and with each of the double band assemblies 134 including one mother's band 140 and one baby's band 142.

Moving progressively downwardly along FIG. 9, between each double band assembly 134 and the next triple band assembly 132, there will be a scrap mother's band 144 with an end-connected scrap piece 146 and two adjacent connected scrap pieces 148. Also, between each triple band assembly 132 and the next directly adjacent double band assembly 134 there will be an end-connected scrap piece 150 and an adjacent connected scrap piece 152, all said scrap band and scrap pieces being discarded at the time of separation of the triple and double band assemblies 132 and 134.

Thus, a sheet of bands 94 may be selectively separated into a plurality of band assemblies by tearing along the previously described heat-seal formed tear lines with each ultimate band assembly including a plurality of identification bands, of the correct number for a particular use. All triple band assemblies 110 may be provided from said sheet of bands 94 in the manner shown in FIG. 7, or all double band assemblies 122 may be provided in the manner shown in FIG. 8, or alternate triple band assemblies 132 and double band assemblies 134 may be provided in the manner shown in FIG. 9. The more important feature from the broader standpoint is that a plurality of band assemblies, whether double or triple band assemblies, may be provided from one of the sheet of bands 94 and each of said band assemblies will include a plurality of bands retained together as a multiple band assembly until the exact moment of use, so that it is unnecessary to select bands of various types at the time of use.

Apparatus for producing a modified form of identification band assembly and a modified form of individual identification bands is shown in FIG. 10, and includes a continuous ply supply roll 154, a continuous membrane supply roll 156, a strap portion supply roll 158, and axially aligned and axially spaced pocket portion supply rolls 160.

The various supply rolls 154 through 160 direct various plastic material plies, to be hereinafter described, between positioning rolls 162 and through die frame 164 beneath heat-sealing die 166, in the manner as hereinbefore discussed. The heat-sealing die 166 again forms the various identification bands by heat-sealing the peripheral edges thereof and at the same time weakening the multiple plies to form tear lines therebetween.

In the modified form of the identification band assembly, however, a continuous ply 168 from the supply roll 154, a strap portion ply 170 from the supply roll 158 and pocket portion plies 172 from the supply rolls 160 are all formed of a relatively soft, stretchable plastic material, whereas a membrane ply 174 from the supply roll 156 is formed of a relatively non-stretchable plastic material.

As shown in FIG. 11, the membrane ply 174 is coextensive with the continuous ply 168 so that said membrane ply is continuous throughout the identification band constructions. Thus, the non-stretchable membrane ply 174 will provide non-stretchability for each of the flat identification band constructions despite the fact that the remaining plies thereof, that is, the continuous, strap portion and pocket portion plies 168, 170 and 172 are of a relatively easily stretchable plastic material.

All of the plies of the identification bands of the present invention, with the exception of the membrane ply 174 of the modified form of FIGS. 10 and 11, may be formed of polyvinyl plastic material, the particular compounding and calendering determining the stretchability thereof. The membrane ply 174 of the modified form of FIGS. 10 and 11 may be formed of a specially oriented vinyl plastic material which has been calendered in a particular manner to provide the relative non-stretch qualities thereof. Other plastic materials of similar character may be used.

According to the present invention, therefore, we have provided a multiple identification band assembly which includes a plurality of bands secured together for ready separation at the time of use merely by tearing along peripheral tear lines between said bands. In this manner, the proper number of bands required for multiple identification of a single patient or multiple identification of related patients are retained together in a single assembly until the exact moment of securing the bands to the patient or patients. The initial selection of the proper bands for the patient or patients has, therefore, been made at the time of fabrication of the assembly so that the nurses are relieved of such selection at the time of use.

Furthermore, we have provided methods for fabricating the multiple identification band assemblies of the present invention, which methods are relatively simple and economical in nature, thereby providing the band assemblies at a minimum of cost. A plurality of the multiple band assemblies may be fabricated in a single sheet with said fabrication inherently providing the necessary tear lines between the various multiple band assemblies.

In addition, the fabricating heat-sealing operation for heat-sealing the peripheral edges of the individual bands of the multiple band assemblies and of the sheet of a plurality of the multiple band asemblies inherently forms a weakened line between said individual bands to serve as a tear line therebetween, making possible the selective separation of groups of the individual bands from the sheet for the provision of the multiple band assemblies, and also makes possible the later separation of the individual bands of a given multiple band assembly at the time of use.

We claim:
1. In a multiple identification band assembly, the combination of: a multiple ply, sheet-like assembly of a plurality of individual identification bands, said sheet-like assembly extending longitudinally with said bands extending transversely thereof and being longitudinally adjacent and parallel of each other; each band of said assembly including identification pocket and strap portions defined by peripheral edges, each of said bands of said sheet-like assembly extending transversely opposite at least one longitudinally adjacent of said bands with all of said band strap portions being formed by a transversely intermediate portion of said sheet-like assembly and all of said band pocket portions being formed by transversely spaced opposite edge portions of said sheet-like assembly transversely bordering said intermediate portion of said sheet-like assembly, a part of each band strap portion peripheral edges being longitudinally abuttingly joined by selectively separable tear line means to longitudinally adjacent other band strap portion peripheral edges to form said assembly; each band having fastening means thereon for securing said pocket and strap portions together extending in continuous encircling band form during use; said tear line means being formed continuously around peripheral edges of each of said bands within said sheet-like assembly for selective tearing separation of said bands one from the other and from said sheet-like assembly along said tear line means prior to said use; sealing means around said peripheral edges of each said bands; and unsealed overlapped ply edges adjacent said strap portion of each of said bands providing opening means communicating interiorly of said pocket portion.

2. A multiple identification band assembly as defined in claim 1, in which said strap portions of all of said bands are overlapping in said assembly throughout major transverse extensions thereof and are abuttingly edge-connected by said tear line means.

3. A multiple identification band assembly as defined in claim 1, in which all of said strap portions of said bands are overlapping in said assembly throughout major transverse extensions thereof and are abuttingly edge-connected by said tear line means; and in which pocket portions of at least two bands of said assembly are longitudinally aligned oppositely transversely depending from a pocket portion of at least one other band of said assembly, said strap portions of said two bands abuttingly nesting at least a part of said strap portion of said one other band longitudinally therebetween.

4. A multiple identification band assembly as defined in claim 1, in which said bands are formed of multiple ply plastic material; in which said tear line means and said sealing means are formed by heat-sealed tear line means sealing said plies at said band peripheral edges while weakening said plies adjacent said sealed peripheral edges for said selective tearing separation; and in which each of said band pocket portions is formed by overlying ply layers separable within said band pocket portion peripheral edges, one of said ply layers of each band being formed by at least two transversely adjacent and transversely overlapping plies free of sealing at said overlap and forming said opening means transversely into said pocket portion adjacent said strap portion.

5. A multiple identification band assembly as defined in claim 1, in which all of said strap portions of said bands are overlapping in said assembly throughout major transverse extensions thereof and are abuttingly edge-connected by said tear line means; in which said bands are formed of multiple ply plastic material; in which said tear line means and said sealing means are formed by heat-sealed tear line means sealing said plies at said band peripheral edges while weakening said plies adjacent said sealed peripheral edges for said selective tearing separation; and in which each of said band pocket portions is formed by overlying ply layers separable within said band pocket portion peripheral edges, one of said ply layers of each band being formed by at least two transversely adjacent and transversely overlapping plies free of sealing at said overlap and forming said opening means transversely into said pocket portion adjacent said strap portion.

6. A multiple identification band assembly as defined in claim 1, in which said assembly includes at least one band of at least transversely reduced size from another band of said assembly transversely opposed thereto.

7. A multiple identification band assembly as defined in claim 1, in which said strap portions of all of said bands are overlapping in said assembly throughout major transverse extensions thereof and are abuttingly edge-connected by said tear line means; and in which said assembly includes at least one band of at least transversely reduced size from another band of said assembly transversely opposed thereto.

8. A multiple identification band assembly as defined in claim 1, in which all of said strap portions of said bands are overlapping in said assembly throughout major transverse extensions thereof and are abuttingly edge-connected by said tear line means; in which pocket portions of at least two bands of said assembly are longitudinally aligned oppositely transversely depending from a pocket portion of at least one other band of said assembly, said strap portions of said two bands abuttingly nesting at least a part of said strap portion of said one other band longitudinally therebetween; and in which said two bands having said pocket portions thereof longitudinally aligned are of at least transversely reduced size from said one other band.

9. In a multiple identification band assembly, the combination of: a plurality of relatively flat, multiple ply, flexible, identification bands; each of said bands having an elongated identification pocket portion end connected to an elongated strap portion with fastening means on at least one of said portions for selectively securing free ends of said portions extending in a continuous encircling band at the time of use; sealing means around said peripheral edges of each of said bands; selectively separable tear line means joining certain side peripheral edges of each of said bands adjacent said peripheral edge sealing means to side peripheral edges of at least one other of said bands for providing a relatively flat, unitary, multiple band assembly, said assembled bands being parallel in said assembly and being selectively separable into individual band units by tearing along said tear line means in preparation for use, those bands having their sides adjacent having said pocket portions thereof spaced apart endwise of said bands with said bands extending endwise in opposite directions and with major parts of said band strap portions side edges aligned and abutting; and unsealed overlapped ply edges adjacent said strap portion of each of said bands providing opening means communicating interiorly of said pocket portion.

10. A multiple identification band assembly as defined in claim 9, in which said assembly includes at least three bands and said strap portions of all of said bands are at least partially overlapping in said assembly and are edge-connected by said tear line means; and in which said pocket portions of at least two of said bands of said assembly are edgewise aligned and oppositely depending from a pocket portion of at least one other band of said assembly, said strap portions of said two bands edgewise nesting and edge abutting at least a part of said strap portion of said one other band therebetween.

11. In the method of forming a multiple identification band assembly, the steps of: superimposing a plurality of plies of flexible material; forming peripheral edge sealing means and selectively separable tear line means on said superimposed plies to define a series of individual identification bands each sealed around peripheral edges thereof and having endwise connected elongated identification pocket and elongated strap portions and each side-interconnected to another adjacent said sealing means through said tear line means; during said tear line means formation, defining each band extending endwise oppositely from a side adjacent of said bands with said band pocket portions spaced endwise apart and said band strap portions having major parts thereof overlapping and side abutting; during formation of said bands, forming unsealed overlapped ply edges adjacent said strap portion of each of said bands providing opening means communicating interiorly of said pocket portion; and separating selected groups of said bands along parts of said tear line means to provide a series of multiple band assemblies each having unseparated tear line means interconnecting the individual bands of said multiple band assembly with said unseparated tear line means being capable of selective separation to separate said assembly individual bands at the time of use, each of said multiple band assemblies including at least two oppositely endwise extending bands having said pocket portions spaced endwise apart and said strap portions sidewise abutting.

12. The method as defined in claim 11, in which said step of forming said sealing means and said tear line means includes the forming of said sealing means by heat-sealing to intimately heat-join said plies at said peripheral edges thereof while weakening said plies to provide said tear line means adjacent said sealing means.

13. In the method of forming a multiple identification band assembly, the steps of: forming a plurality of individual identification bands each having endwise connected elongated identification pocket and elongated strap portions; maintaining said plurality of bands peripherally interconnected and at least partially side adjacent during said formation to provide a unitary multiple band assembly; during said multiple band assembly formation maintaining each band extending endwise oppositely from a side adjacent of said bands with said band pocket portions spaced endwise apart and said band strap portions having major parts thereof overlapping and side abutting; during formation of said bands, forming unsealed overlapped ply edges adjacent said strap portion of each of said bands providing opening means communicating interiorly of said pocket portion; and forming peripheral edge sealing means around band peripheral edges and selectively separable tear line means at said peripheral interconnections during said formation to provide said bands of said multiple band assembly capable of selective separation into individual bands adjacent said sealing means at the time of use.

14. The method as defined in claim 13, in which the step of forming said plurality of bands includes the forming of said plurality of bands by the step of superimposing multiple ply plastic sheet material; in which the step of forming said sealing means and said tear line means includes the forming of said sealing means by heat sealing to intimately heat-seal said plies together around peripheral edges thereof while weakening said plies at said peripheral interconnections adjacent said sealing means to provide said tear line means.

References Cited

UNITED STATES PATENTS

| | | | |
|---|---|---|---|
| 1,864,516 | 6/1932 | Becket | 206—56 |
| 2,778,336 | 1/1957 | Liguori | 206—56 |
| 3,033,257 | 5/1962 | Weber | 156—251 X |
| 3,074,540 | 1/1963 | Beich et al. | 206—43 |
| 3,279,107 | 10/1966 | Baumgartner. | |
| 3,305,421 | 2/1967 | Raffaelli | 156—253 |

MARTHA L. RICE, Primary Examiner

U.S. Cl. X.R.

40—21; 156—250